United States Patent [19]

Itokawa et al.

[11] Patent Number: 5,790,500
[45] Date of Patent: Aug. 4, 1998

[54] APPARATUS FOR RECORDING/REPRODUCING CONVERTED FOUR-CHANNEL AUDIO SIGNALS

[75] Inventors: Osamu Itokawa, Tokyo; Kenichi Nagasawa; Kumiharu Takai, both of Kanagawa-ken, all of Japan

[73] Assignee: Canon Kabushiki Kaisha, Tokyo, Japan

[21] Appl. No.: 369,278

[22] Filed: Jan. 5, 1995

Related U.S. Application Data

[63] Continuation of Ser. No. 833,355, Feb. 10, 1992, abandoned.

[30] Foreign Application Priority Data

Feb. 19, 1991 [JP] Japan ................................ 3-024455

[51] Int. Cl.$^6$ ................................................ G11B 3/74
[52] U.S. Cl. ........................... 369/90; 369/89; 381/21; 381/23; 360/18
[58] Field of Search .................. 369/89, 90, 86, 369/175, 5; 381/21, 22, 3, 5, 6, 23; 360/18, 19.1, 63, 24; 386/95–99

[56] References Cited

U.S. PATENT DOCUMENTS

| | | | |
|---|---|---|---|
| 3,889,061 | 6/1975 | Ito et al. | 369/90 |
| 3,914,790 | 10/1975 | Shimada | 360/63 |
| 3,971,890 | 7/1976 | Bauer | 369/89 |
| 3,985,978 | 10/1976 | Cooper | 369/89 |
| 4,001,518 | 1/1977 | Sugimoto | 369/50 |
| 4,003,089 | 1/1977 | Maurer | 360/63 |
| 4,006,306 | 2/1977 | Driscoll | 369/5 |
| 4,013,841 | 3/1977 | Ohkubo et al. | 369/89 |
| 4,121,059 | 10/1978 | Nakabayashi | 369/89 |
| 4,630,134 | 12/1986 | Kanamaru | 360/19.1 |
| 5,172,415 | 12/1992 | Fosgate | 381/22 |
| 5,177,798 | 1/1993 | Ohsawa | 387/22 |

FOREIGN PATENT DOCUMENTS 5340501 4/1978 Japan ................................ 369/90

*Primary Examiner*—Aristotelis M. Psitos
*Assistant Examiner*—Larry T. Cullen
*Attorney, Agent, or Firm*—Roboin, Blecker & Daley

[57] ABSTRACT

A recording and reproducing system is arranged to record converted two-channel audio signals obtained by using all four-channel stereophonic audio signals and audio signals of two specific channels included in the four-channel stereophonic audio signals on a recording medium as four-channel recording audio signals and, at the time of reproduction, to be capable of restoring the four-channel recording audio signals to the four-channel stereophonic audio signals and also to permit either the four-channel stereophonic audio signals or the converted two-channel audio signals to be selectively outputted.

18 Claims, 7 Drawing Sheets

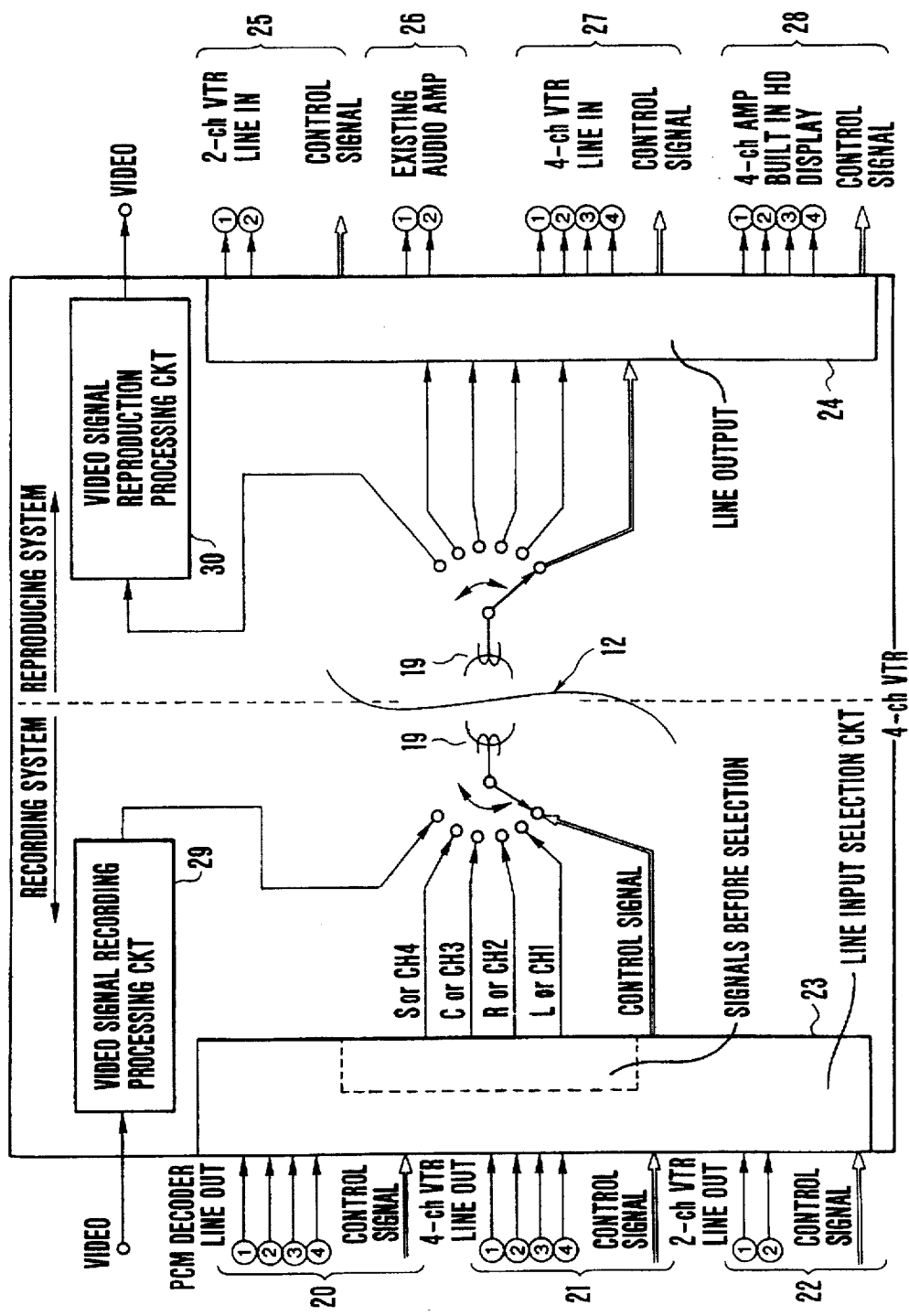

APPARATUS FOR RECORDING/ REPRODUCING CONVERTED FOUR-CHANNEL AUDIO SIGNALS

This is a continuation application under 37 CFR 1.62 of prior application Ser. No. 07/833,355 filed Feb. 10, 1992 now abandoned.

BACKGROUND OF THE INVENTION

1. Field of the Invention

This invention relates to recording and reproduction of information signals to be performed for a high-definition television display, a decoder, a four-channel VTR, a two-channel VTR, an ordinary audio apparatus or the like.

2. Description of the Related Art

Compared with the conventional TV, a system called "high-definition television" reproduces an image which gives a much greater feeling of presence by virtue of its visual function based on a high-definition and large display.

Meanwhile, a stereophonic audio system having four independent audio channels has been proposed as an audio system suited for the high-definition television. To minimize a directional discrepancy between a pictorial image and a sound image irrespectively of auditorial positions, this audio system is arranged to have three of the four channels allocated in front of the display while the remaining one channel (with a plurality of speakers) is allocated in the rear for the purpose of attaining a surrounding effect or creating a state of having a sound source in the rear. The stereophonic system having three channels in front and one in the rear of the display is called a 3-1 system.

This system gives four-channel stereophonic audio signals including an L (left) signal which is an audio signal from a front left part, an R (right) signal which is an audio signal from a front right part, a C (center) signal which is an audio signal from a front middle part and an S (surround) signal which is an audio signal from a rear part.

In converting a high-definition television program which is prepared with the above-stated four-channel (hereinafter referred to as 4-ch) stereophonic audio signals into two-channel (hereinafter referred to as 2-ch stereophonic audio signals), a conversion matrix of $$L'=L+0.7\ C+0.7\ S$$
$$R'=R+0.7\ C+0.7\ S$$

is used to obtain the 2-ch (L' and R') audio signals. It is known that the use of this conversion matrix gives a stereophonic feeling which is almost the same as a feeling obtainable from a high-definition television program which is originally prepared with 2-ch stereophonic audio signals.

Referring to FIGS. 5, 6 and 7 of the accompanying drawings, a conventional 4-ch VTR which is arranged to record and reproduce high-definition television audio signals is described as follows: FIG. 5 shows the typical arrangement of the conventional digital recording/ reproducing system for audio signals. FIG. 6 shows a format used by the 4-ch VTR for recording on a magnetic tape. FIG. 7 shows the arrangement of the conventional 4-ch VTR.

Referring to FIG. 5, the illustration includes an input terminal 1; an A/D (analog-to-digital) converter 2; an error correction code (ECC) encoder 3; a modulator 4; a recording amplifier 5; a recording/reproducing mechanical part 6; a reproduction amplifier 7; a demodulator 8; an ECC decoder 9; a D/A (digital-to-analog) converter 10; and an output terminal 11.

The digital recording/reproducing system having the above-stated component parts performs recording and reproduction in the following manner: when an audio signal is applied to the input terminal 1, the audio signal which is an analog signal is converted into a digital signal by the A/D converter 2. At the ECC encoder 3, an error correction code (ECC) is added to the digital signal and a shuffling process is performed to rearrange the signal in the direction of time. After the shuffling, the signal is applied to the modulator 4 to be subjected to a digital modulation process.

The output of the modulator 4 is amplified by the recording amplifier 5. The output of the recording amplifier 5 is supplied to the recording/reproducing mechanical part 6 to be recorded on a magnetic tape which is employed as an information recording medium. The recorded signal is read out by the recording/reproducing mechanical part 6 and is supplied via the reproduction amplifier 7 to the demodulator 8 to be subjected to a digital demodulation process. The output of the demodulator 8 is supplied to the ECC decoder 9. The ECC decoder 9 corrects any code error of the reproduced signal and also performs a deshuffling process to rearrange the signal back to its original state. The signal thus deshuffled is converted into an analog audio signal by the D/A converter 10 and is outputted from the output terminal 11.

In FIG. 6, a reference numeral 12 denotes a magnetic tape. Numerals 13, 14, 16 and 17 denote audio signal tracks. Each of these tracks is arranged to have an audio signal recorded therein for one channel. A numeral 15 denotes a video signal track. A numeral 18 denotes a recording track provided for recording a control signal for controlling the mode of audio signals.

In recording 4-ch stereophonic signals (L, R, C and S signals) mentioned above, for example, the L signal is recorded in the track 17; the R signal in the track 16; the C signal in the track 14; and the S signal in the track 13. In a case where the 4-ch audio signals (CH1, CH2, CH3 and CH4 signals) of a system other than the above-stated stereophonic audio system are to be recorded, the CH1 signal is recorded in the track 17; the CH2 signal in the track 16; the CH3 signal in the track 14; and the CH4 signal in the track 13.

Referring to FIG. 7, the audio signal input and output sources of the VTR are first described as follows:

In FIG. 7, reference numerals 20, 21 and 22 respectively denote the line output arrangement of the input sources, including the line output terminals of a PCM decoder, a 4-ch VTR and a 2-ch VTR. A numeral 23 denotes a line input selection circuit. Audio signals of four or two channels coming from the input sources 20, 21 or 22 are multiplexed in a time-sharing manner to be recorded on a magnetic tape 12 by a head 19.

A video signal which is inputted also to the 4-ch VTR comes to a video signal recording processing circuit 29 to be processed there into a state of being recordable on the magnetic tape 12. The video signal thus processed is recorded after it is multiplexed in a time sharing manner with the audio signals.

The recorded audio signals are read out by the head 19 and is outputted from line output terminals 24. The audio signals outputted are received through the line input terminals of signal sources 25, 26, 27 and 28.

The recorded video signal is read out by the head 19. A video signal reproduction processing circuit 30 then processes the video signal in a manner reverse to the processing operation of the video signal recording processing circuit 29.

Further, in transmitting the high-definition television audio signals, the sounds can be transmitted in sound modes of varied kinds by means of audio control codes.

In a case where the input signals from the PCM decoder is an L signal, an R signal, a main sound signal and a sub-sound signal, for example, the R signal is recorded in the track 16, the L signal in the track 17, the sub-sound signal in the track 13 and the main sound signal in the track 14 on the magnetic tape 12 as shown in FIG. 6. In reproducing the record for dubbing by using a 4-ch VTR 27, for example, the L signal, the R signal, the main sound signal and the sub-sound signal are respectively outputted to the line output terminals (1) to (4). A control signal is outputted along with these audio signal outputs. The arrangement described above has been generally employed for high-definition television audio signal transmission from one apparatus to another.

However, the conventional 4-ch recording or reproducing VTR has the following shortcomings: with the L, R, C and S audio signals recorded, in cases where, for example, the record obtained by four channels is to be dubbed by a 2-ch VTR or where amplifiers disposed within a high-definition (HD) display device are for two-channel reproduction, it is only the L and R signals that can be reproduced. Such conditions not only deform the original sound image but also give such sounds that differ in quality from the sounds of the conventional 2-ch stereophonic reproduction. Another shortcoming of the conventional VTR resides in that the VTR is provided with no after-recording arrangement.

SUMMARY OF THE INVENTION

It is a principal object of this invention to provide a recording apparatus, a reproducing apparatus and a recording/reproducing system which solve the above-stated problems of the conventional 4-ch VTR and are capable of transmitting high-definition television audio signals to another apparatus, such as a 2-ch VTR, without deforming the sound image of the audio signals.

To attain this object, a recording apparatus arranged as an embodiment of this invention comprises input means for inputting four-channel stereophonic audio signals; conversion means for forming converted two-channel audio signals by using all the four-channel stereophonic audio signals inputted to the input means; and recording means for recording, on a recording medium, the converted two-channel audio signals and audio signals of two specific channels among the four-channel stereophonic audio signals as four-channel recording audio signals.

A reproducing apparatus arranged as an embodiment of this invention to reproduce audio signals from a recording medium on which converted two-channel audio signals formed by using all four-channel stereophonic audio signals and audio signals of two specific channels included in the four-channel stereophonic audio signals are recorded as four-channel recording audio signals comprises restoring means for restoring the four-channel recording audio signals to the four-channel stereophonic audio signals; and selection means for selectively outputting the four-channel stereophonic audio signals or the converted two-channel audio signals.

Further, a recording/reproducing system arranged as an embodiment of this invention comprises a recording apparatus which records input audio signals of a plurality of channels on a recording medium; and a reproducing apparatus which reproduces the audio signals of the plurality of channels from the recording medium. In the system, the recording apparatus is arranged to form converted audio signals from the audio signals of the plurality of channels in recording the audio signals of the plurality of channels; and the reproducing apparatus is arranged to selectively output the converted audio signals or the original audio signals of the plurality of channels obtained by restoring the converted audio signals to their original states.

Other objects and advantages of the invention will become apparent from the following detailed description taken in conjunction with the accompanying drawings.

BRIEF DESCRIPTION OF THE DRAWINGS

FIG. 7 shows the arrangement of the conventional 4-ch VTR.

DETAILED DESCRIPTION OF THE PREFERRED EMBODIMENTS

Figure 1:
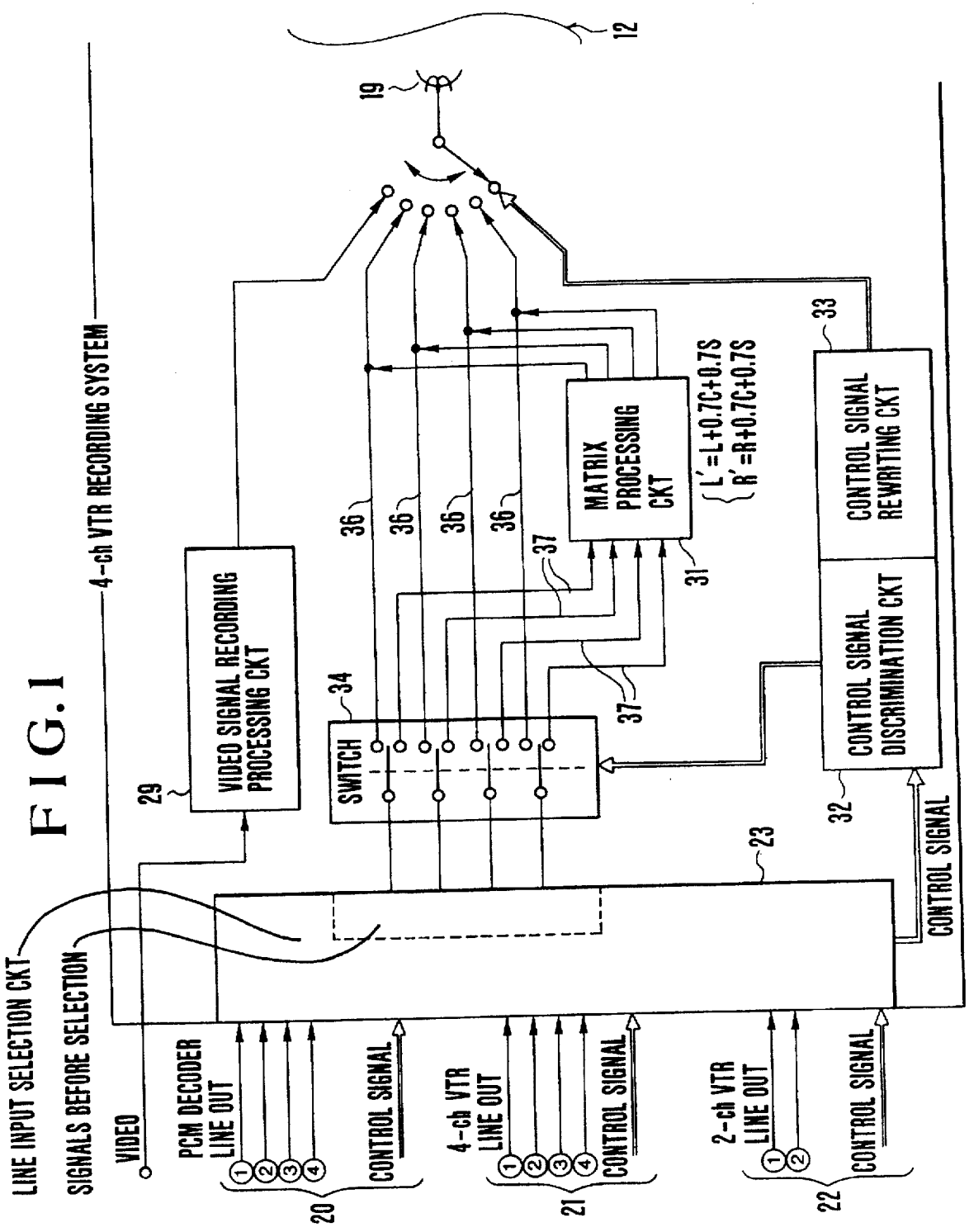
FIG. 1 is a diagram showing the arrangement of the recording system of a 4-ch VTR arranged as a first embodiment of this invention.
Figure 2:
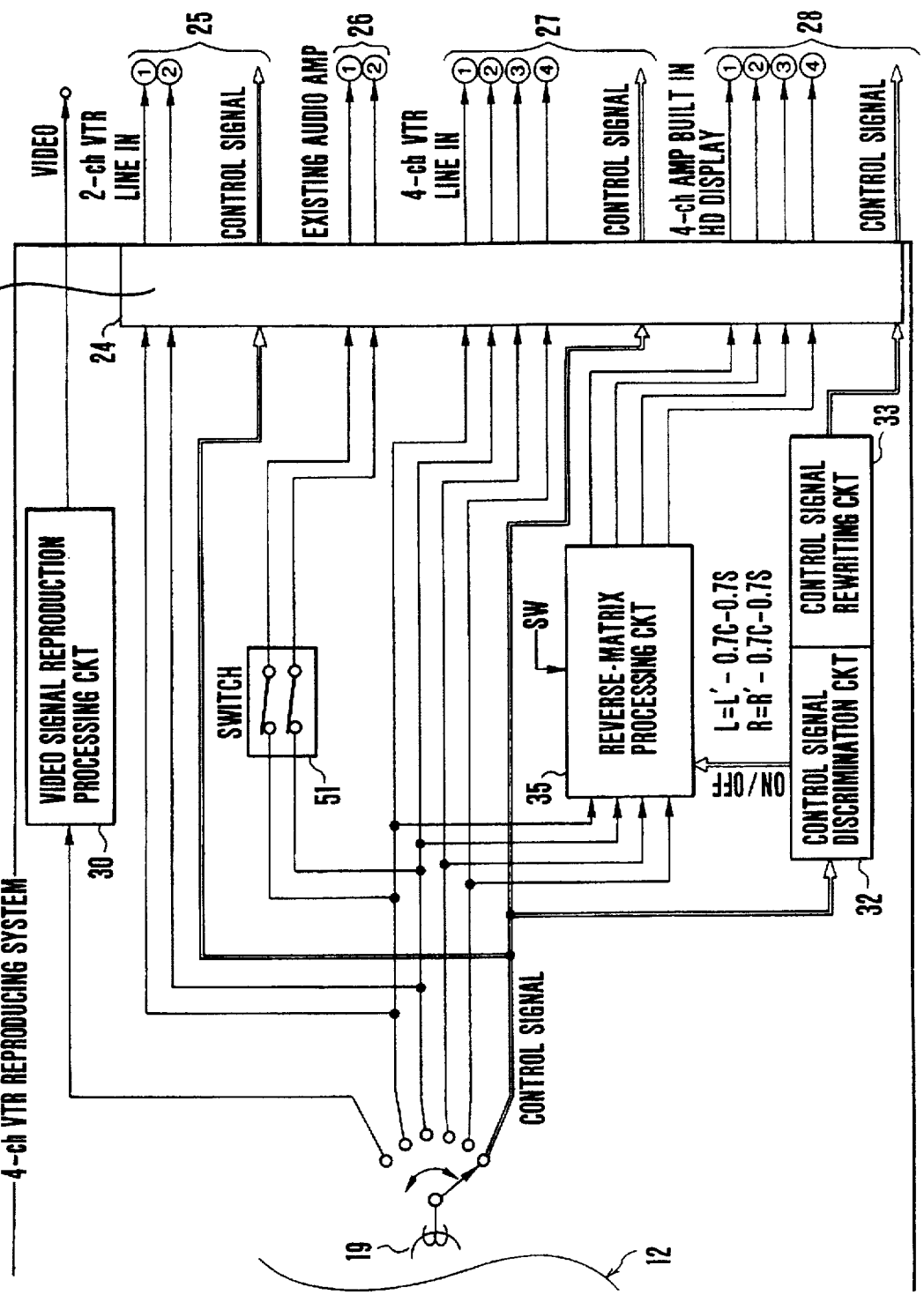
FIG. 2 is a diagram showing the arrangement of the reproducing system of the 4-ch VTR arranged as the first embodiment.

The following describes a recording/reproducing system (a 4-ch VTR) arranged as a first embodiment of the invention with reference to FIGS. 1 and 2:

FIG. 1 shows the arrangement of the recording system of the 4-ch (four-channel) VTR which is the first embodiment of the invention and FIG. 2 that of the reproducing system of the same 4-ch VTR. In FIGS. 1 and 2, the parts which are the same as or equivalent to the parts shown in FIG. 7 are indicated by the same reference numerals as in FIG. 7 and the details of them are omitted from description. Referring to FIGS. 1 and 2:

A matrix processing circuit 31 is arranged to form 2-ch (two-channel) stereophonic signals L' and R' (converted audio signals) by performing a converting matrix process on high-definition television audio signals L, R, C and S as follows: $L'=L+0.7C+0.7S$ and $R'=R+0.7C+0.7S$.

A control signal discrimination circuit 32 is arranged to discriminate the mode of the audio signals. A control signal rewriting circuit 33 is arranged to rewrite a control signal when the matrix process is performed on the audio signals. While the control signal discrimination circuit 32 and the control signal rewriting circuit 33 are shown as separately included in both the recording and reproducing systems in FIGS. 1 and 2, they are arranged in actuality to be used in common for recording and reproduction. A switch 34 is controlled according to the mode of the audio signal found by the control signal discrimination circuit 32. A reverse-matrix processing circuit 35 is arranged to restore the L' and R' audio signals to the input L and R audio signals by performing a reverse converting matrix process on the L' and R' audio signals as follows: $L=L'-0.7C-0.7S$ and $R=R'-0.7C-0.7S$.

The operation of the recording system of the 4-ch VTR which is arranged as the first embodiment of this invention as described above is described as follows with reference to FIG. 1:

When the audio signals are inputted to the 4-ch VTR, a control signal for the audio signals is inputted to the control signal discrimination circuit 32. The mode of the audio signals (hereinafter referred to as the audio mode) is discriminated by the circuit 32. The operation of the switch 34 is controlled according to the audio mode. The method for controlling the switch 34 is as follows: the switch 34 is connected to the lines of terminals 37 which are disposed on one side of switch positions when 3-ch or 4-ch stereophonic audio signals (L, R and C or L, R, C and S) are included in the input audio signals. The switch 34 is connected to the lines of other terminals 36 which are on the other side of the switch positions in the event of other input audio signals.

Therefore, in cases where 3-ch or 4-ch stereophonic audio signals are included in the input audio signals, the matrix processing circuit 31 performs the above-stated matrix conversion. As a result, signals are recorded on the magnetic tape 12 in accordance with a recording format which is as shown in FIG. 3.

Figure 3:
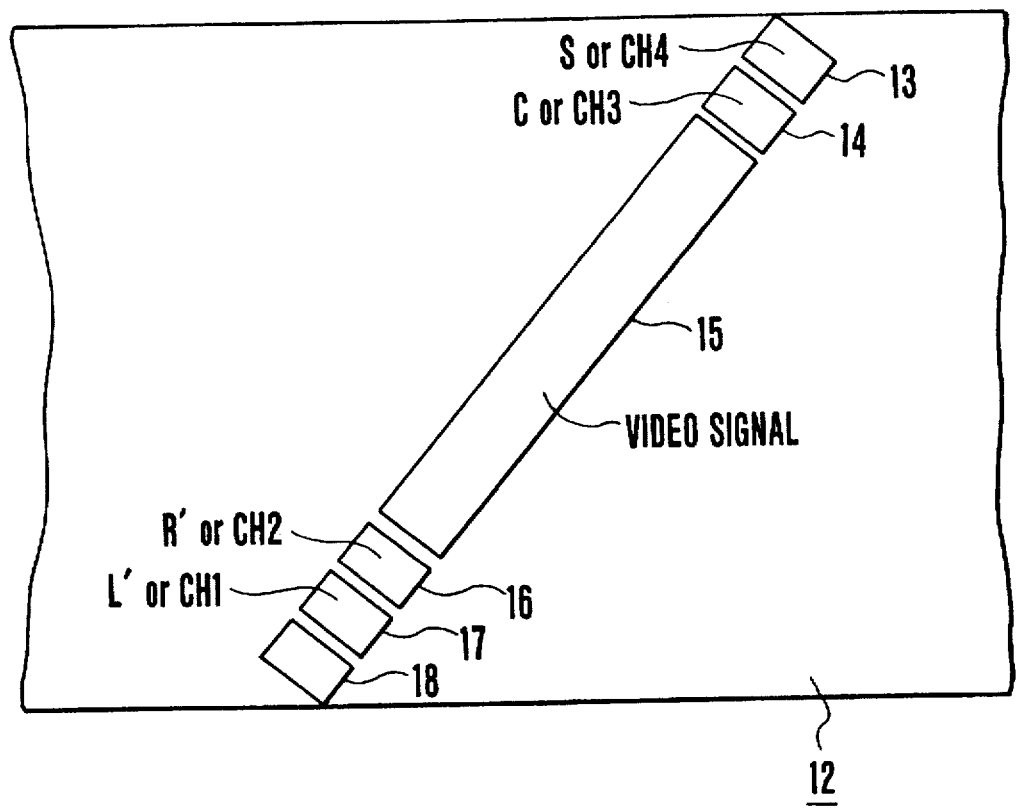
FIG. 3 shows a recording format for recording on a magnetic tape with the embodiment of the invention.

If the input audio signals do not include the 3-ch or 4-ch stereophonic audio signals, input audio signals CH1, CH2, CH3 and CH4 are recorded on the magnetic tape 12 as they are, as shown in FIG. 3.

A video signal is recorded or reproduced in the same manner as the conventional 4-ch VTR.

Next, the operation of the reproducing system of the 4-ch VTR arranged as the first embodiment of this invention is described as follows, with reference to FIG. 2: in transmitting the audio signals recorded on the magnetic tape 12 to a high-definition (HD) display device 28, a control signal which is also recorded on the magnetic tape 12 is first inputted to the control signal discrimination circuit 32. The circuit 32 then discriminates the audio mode to decide whether the recorded audio signals are to be subjected to the reverse matrix process.

This decision is made as follows: the reverse-matrix processing circuit 35 is turned on to perform the reverse matrix process on the recorded audio signals if 3-ch or 4-ch stereophonic audio signals are included in the audio signals recorded on the magnetic tape 12. The reverse-matrix processing circuit 35 is turned off to allow the recorded audio signals to be outputted as they are if the recorded audio signals are other than the 3-ch or 4-ch stereophonic audio signals.

In a case where amplifiers disposed within the HD display device 28 are only for two-channel reproduction, a switch which is included in the reverse-matrix processing circuit 35 turns off to prevent the reverse matrix process from being performed even if 3-ch or 4-ch stereophonic audio signals are recorded on the tape 12. Further, when the reverse matrix process is performed on the audio signals recorded on the magnetic tape 12, the control signal which is also recorded on the tape is inputted to the control signal rewriting circuit 33 to be rewritten and to be outputted in a renewed state.

In a case where the audio signals recorded on the magnetic tape 12 are transmitted to a device other than the HD display device 28, such as a 2-ch VTR 25, an existing amplifier 26 and a 4-ch VTR 27, the audio signals recorded are outputted as they are. However, if the audio signals recorded on the magnetic tape 12 are a main sound signal and a sub-sound signal and are transmitted to the existing amplifier 26, the existing amplifier 26 would be incapable of selecting the main or sub-sound signal. The VTR is, therefore, provided with a switch 51 which permits manual selection to be made in such a case.

Table 1 below shows relations between the input audio signals subjected to the matrix process or no matrix process and the output audio signals. Table 2 shows relations between the recorded audio signals subjected to the reverse matrix process or no reverse matrix process and the output audio signals.

TABLE 1

| Input audio signals | Matrix processing circuit | Output signals |
|---|---|---|
| 4-ch (3-1 system) stereophonic L, R, C, S | processed | L', R', C, S |
| 3-ch stereo. + 1 monaural, L, R, C, sub | processed | L', R', C, sub |
| 3-ch stereo. L, R, C, — | processed | L', R', C, — |
| Other signals | not processed | in input states |

TABLE 2

| Audio signals recorded on magnetic tape | Reverse-matrix circuit | Output signals |
|---|---|---|
| L', R', C, S | processed | L, R, C, S |
| L', R', C, sub | " | L, R, C, sub |
| L', R', C, — | " | L, R, C, — |
| Other signals | not processed | in recorded states |

Figure 4:
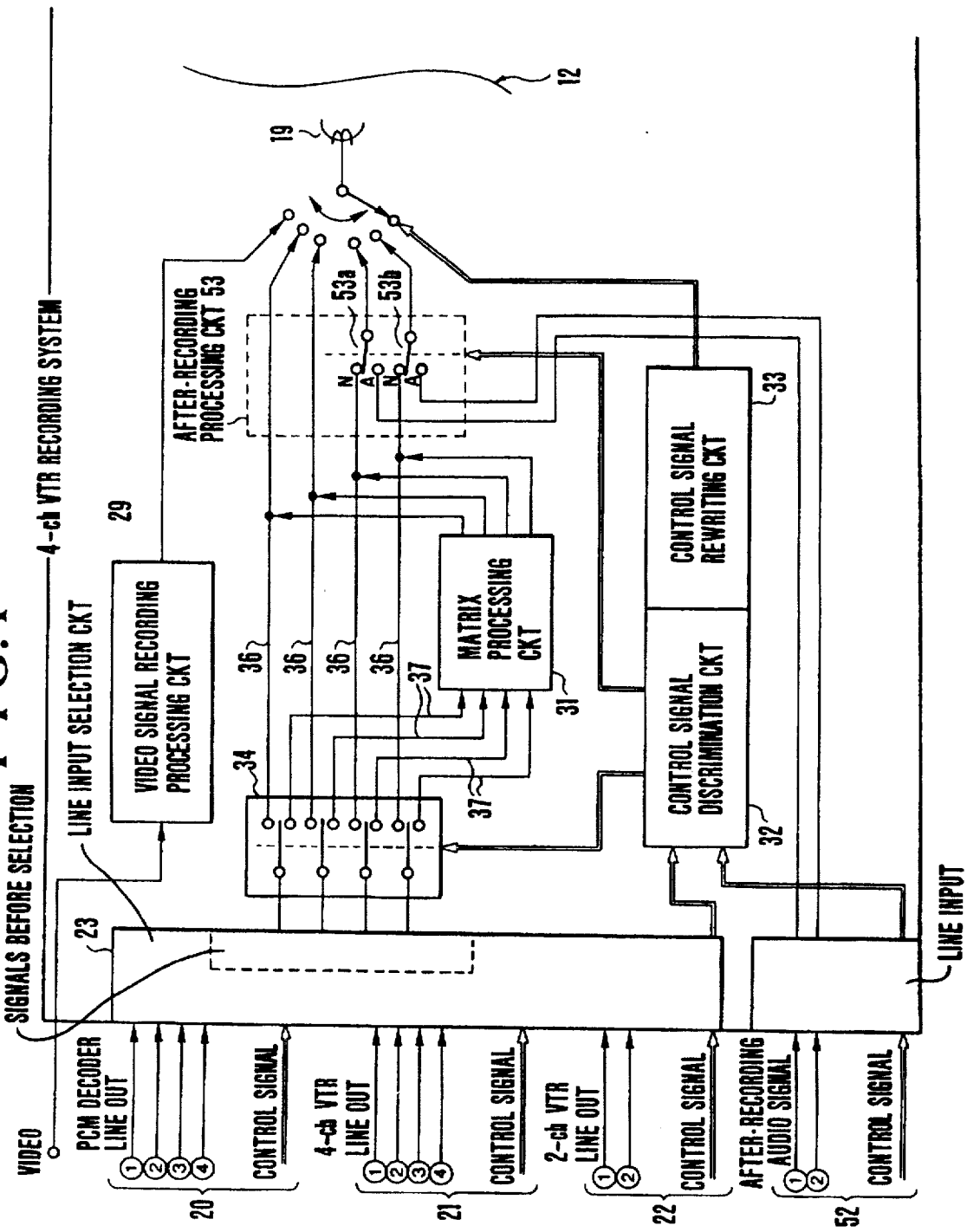
FIG. 4 is a diagram showing the recording system of a 4-ch VTR which includes an after-recording arrangement and is arranged as a second embodiment of the invention.
Figure 5:
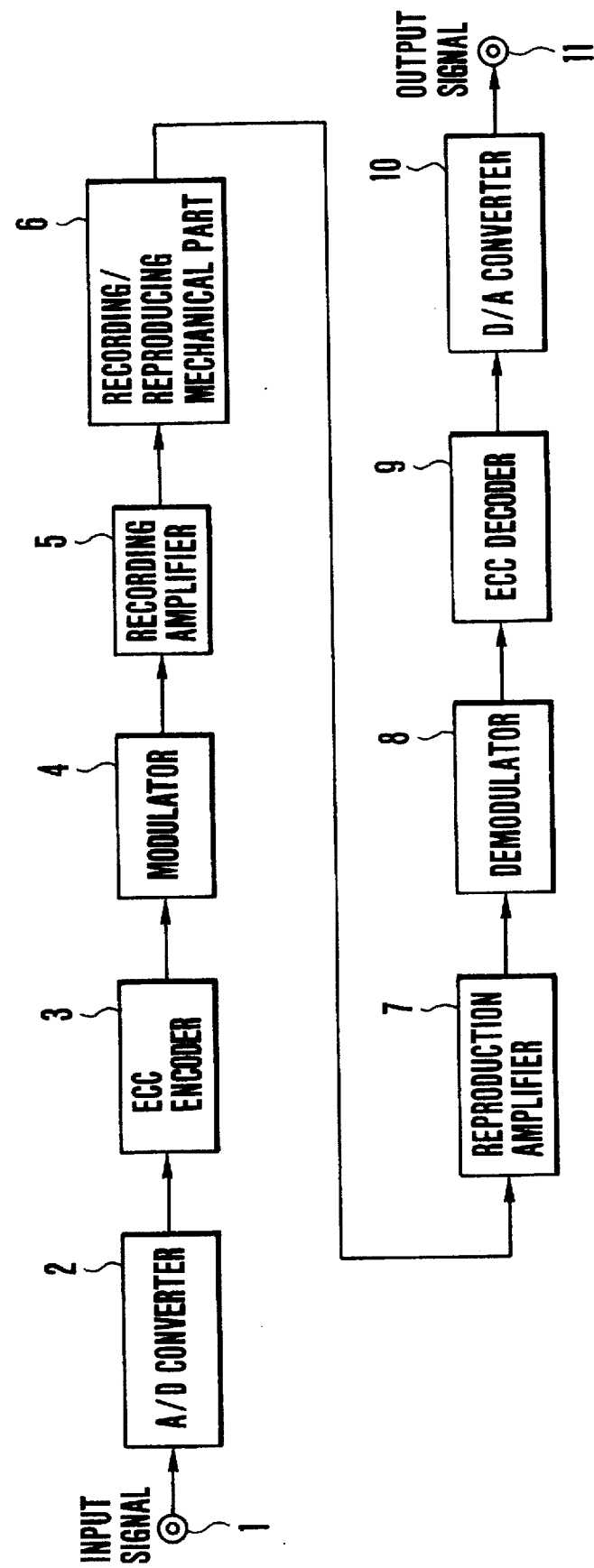
FIG. 5 is a block diagram showing the arrangement of a digital recording/reproducing system generally employed for recording and reproducing high-definition television audio signals.
Figure 6:
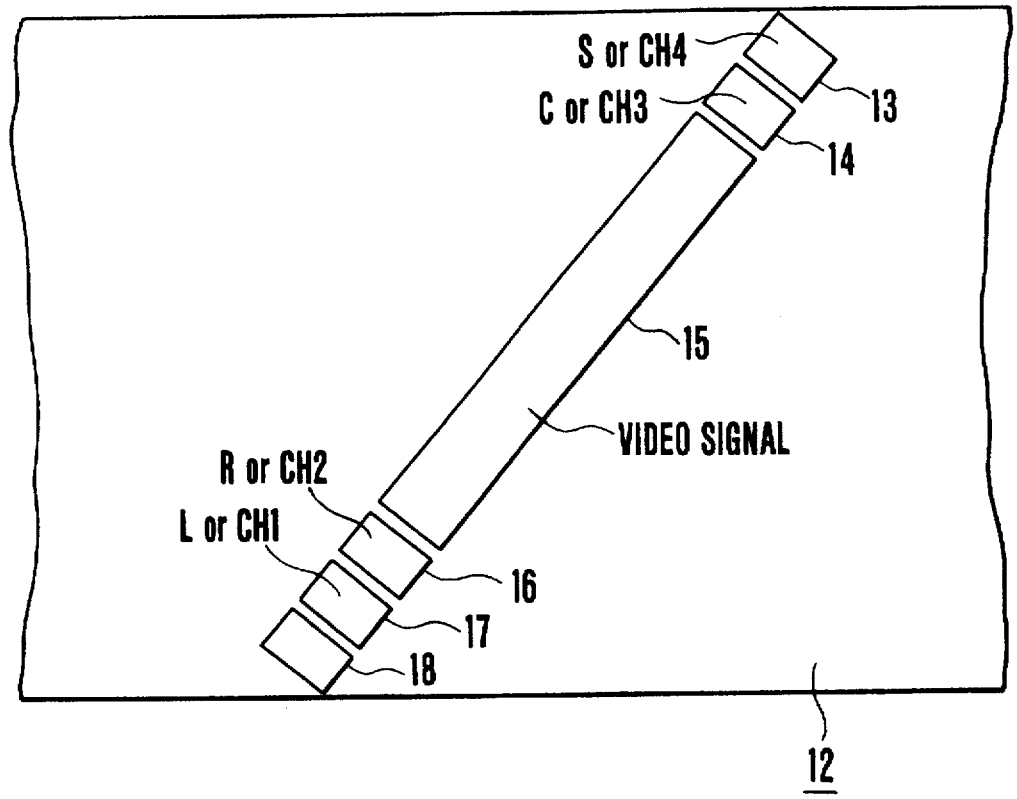
FIG. 6 shows a recording format for recording on a magnetic tape with the conventional 4-ch VTR.

A recording/reproducing system (4-ch VTR) which is arranged as a second embodiment of this invention and includes an after-recording arrangement is described below with reference to FIG. 4:

FIG. 4 shows the arrangement of the recording system-of the 4-ch VTR which includes the after-recording arrangement. In FIG. 4, parts which are the same as or equivalent to the parts shown in FIG. 1 are indicated by the same reference numerals as in FIG. 1 and the details of them are omitted from the following description.

After-recording audio signals 52 are arranged to be supplied to a line input circuit. An after-recording processing circuit 53 is arranged to perform a switching action by means of switches 53a and 53b according to a control signal which is inputted to the control signal discrimination circuit 32. In the case of after-recording, the VTR performs a recording operation as follows:

The after-recording audio signals 52 of two channels are inputted via the line input circuit to the after-recording processing circuit 53. At the circuit 53, the switches 53a and 53b are then respectively connected to contacts on their sides A. During the process of after-recording, the audio signals recorded in the audio signal tracks 16 and 17 as shown in FIG. 3 are left intact while the after-recording audio signals of two channels are recorded in other audio signal tracks 13 and 14. At this time, the control signal input is rewritten by the control signal rewriting circuit 33 before the control signal is recorded on the magnetic tape 12 because of the after-recording process performed.

Recording actions other than the after-recording are performed in the same manner as those of the first embodiment, except that for other recording actions, the switches 53a and 53b are connected to contacts on their other sides N.

The reproducing system of the second embodiment is arranged in the same manner as in the first embodiment. In the second embodiment, the reproducing system operates as follows: the signals recorded on the magnetic tape 12 through the after-recording process are outputted to the outside of the system without being subjected to the reverse matrix process irrespectively of the contents of the audio signal of each channel. The control signal discrimination circuit 32 makes a discrimination between performing and not performing the reverse matrix process.

With 4-ch stereophonic audio signals (of the 3-1 system, for example) inputted, the arrangement described in the foregoing enables each of the embodiments to transmit the audio signals without deforming their original sound images even in cases where only the audio signals of two channels are to be outputted, for example, for dubbing with a 2-ch VTR or where the amplifiers disposed within an HD display device are arranged for 2-ch reproduction. Further, even if after-recording is to be performed on a magnetic tape on which high-definition television audio signals have been recorded, after-recording audio signals can be recorded without impairing the sound quality of reproduction.

While this invention has been described through its preferred embodiments, it is to be understood that the invention may be practiced otherwise in various forms without departing from the spirit and scope of the invention. For example, while each of the embodiments described is arranged to use a magnetic tape as a recording medium, the recording medium usable according to this invention is of course not limited to the magnetic tape and may be a magnetic disc, an optical disc or the like.

Further, the first embodiment may be modified to perform control by arranging the switch 34 within the matrix processing circuit 31. In the second embodiment, the after-recording processing circuit 53 is arranged to be turned on and off by means of the control signal of the after-recording audio signals 52. This arrangement may be changed to perform the switching action on the circuit 53 with a manual on/off switch to input a signal to the control signal discrimination circuit 32 and the after-recording processing circuit 53. Further, according to the foregoing description, the audio signal input for the after-recording is arranged in two channels. However, the number of channels may be changed to one channel or to three channels. In either case, the after-recording process can be likewise performed on the audio signal input.

In other words, the foregoing description of embodiments has been given for illustrative purposes only and not to be construed as imposing any limitation in every respect. The scope of the invention is, therefore, to be determined solely by the following claims and not limited by the text of the specification. Further, it is to be understood that all modifications and alterations made within a scope equivalent to the scope of the claims fall within the true spirit and scope of the invention.

What is claimed is:

1. A recording apparatus comprising:
   a) input means for inputting four-channel stereophonic audio signals;
   b) conversion means for forming converted two-channel audio signals by using the four-channel stereophonic audio signals inputted by said input means; and
   c) recording means arranged to form four-channel recording audio signals by using the converted two-channel audio signals, and original audio signals of two specific channels included in the four-channel stereophonic audio signals and to record the four-channel recording audio signals to thereby form four-channel stereophonic audio signals on a recording medium, said original audio signals of two specific channels being a signal which has not been converted by said conversion means.

2. An apparatus according to claim 1, wherein said input means includes an input portion for inputting two-channel after-recording audio signals.

3. An apparatus according to claim 2, wherein said recording means is arranged to record the two-channel after-recording audio signals inputted from said input portion on the recording medium in an area arranged for recording the original audio signals of two specific channels other than the converted two-channel audio signals included in the four-channel recording audio signals.

4. An apparatus according to claim 1, wherein said four-channel stereophonic audio signals include an L (left) signal for left front sounds, an R (right) signal for right front sounds, a C (center) signal for center sounds and an S (surround) signal for rear sounds.

5. An apparatus according to claim 4, wherein the original audio signals of two specific channels other than the converted two-channel audio signals included in the four-channel recording audio signals are the C and S signals.

6. A reproducing apparatus for reproducing audio signals from a recording medium on which converted two-channel audio signals formed by using four-channel stereophonic audio signals, and original audio signals of two specific channels included in the four-channel stereophonic audio signals are recorded as four-channel recording audio signals, the original audio signals of two specific channels being not converted, comprising;
   a) the reproducing means for reproducing the audio signals from the recording medium;
   b) restoring means for restoring the converted two-channel recording audio signals to original two channel audio signals by using the four-channel recording audio signals reproduced by said reproducing means; and
   c) selection means for selectively outputting the four-channel stereophonic audio signals comprising the two-channel audio signals restored by said restoring means and the original audio signals of two specific channels reproduced from said recording medium, or the converted two-channel audio signals.

7. An apparatus according to claim 6, wherein said four-channel stereophonic audio signals include an L (left) signal for left front sounds, an R (right) signal for right front sounds, a C (center) signal for center sounds and an S (surround) signal for rear sounds.

8. An apparatus according to claim 7, wherein the original audio signals of two specific channels other than the converted two-channel audio signals included in the four-channel recording audio signals are the C and S signals.

9. A recording apparatus comprising:
   a) input means for inputting audio signals of a plurality of channels;
   b) conversion means for forming converted audio signals by using the audio signals of a plurality of channels inputted by said input means; and
   c) recording means for recording the converted audio signals and an original audio signal of at least one specific channel included in the audio signals of a plurality of channels inputted by said input means on a recording medium,
   said original audio signal being a signal which has not been converted by said conversion means.

10. An apparatus according to claim 9, wherein said recording means is capable of further recording image information.

11. An apparatus according to claim 9, wherein said recording medium is a magnetic tape.

12. An apparatus according to claim 9, wherein said conversion means is arranged to be controlled according to the audio signals inputted.

13. An apparatus according to claim 9, wherein said input means includes an input portion.

14. An apparatus according to claim 13, wherein said recording means is arranged to record an after-recording audio signal inputted from said input portion on the recording medium in an area which is provided for recording the original audio signal of the specific channel.

15. An apparatus for reproducing audio signals from a recording medium on which converted audio signals formed by using audio signals of a plurality of channels, and original audio signals of specific channels included in the audio signals of a plurality of channels are recorded, said original audio signals being a signal which has not been converted, comprising;
   a) reproducing means for reproducing the audio signals from the recording medium;
   b) restoring means for restoring the audio signals of a plurality of channels from the audio signals reproduced by said reproducing means; and
   c) selection means for selectively outputting either the audio signals outputted from said restoring means or the converted audio signals.

16. A recording/reproducing system comprising:
   a) a recording apparatus for recording input audio signals of a plurality of channels on a recording medium,
      said recording apparatus being arranged to form converted audio signals by using the audio signals of the plurality of channels when recording the audio signals of the plurality of channels and to record the converted audio signals thus formed and the original audio signals of specific channels included in the audio signals of the plurality of channels, said original audio signals being a signal which has not been converted; and
   b) a reproducing apparatus for reproducing the audio signals of a plurality of channels from the recording medium, said reproducing apparatus being arranged to selectively output either the converted audio signals or the original audio signals of a plurality of channels obtained by restoring the converted audio signals to the original states.

17. A method of recording audio signals, comprising the steps of:
   a) inputting audio signals corresponding to a plurality of channels;
   b) forming converted audio signals by using the inputted audio signals corresponding to a plurality of channels; and
   c) recording the converted audio signals and an original audio signal corresponding to at least one specific channel including in the inputted audio signals corresponding to a plurality of channels, said original audio signals being a signal which has not been converted.

18. A method of reproducing audio signals from a recording medium on which are recorded converted audio signals formed by using audio signals corresponding to a plurality of channels, and original audio signals corresponding to specific channels included in the audio signals corresponding to a plurality of channels, said original audio signals being a signal which has not been converted, the method comprising the steps of:
   a) reproducing the audio signals from the recording medium;
   b) restoring the audio signals corresponding to a plurality of channels from the reproduced audio signals; and
   b) selectively outputting either the restored audio signals or the converted audio signals.

* * * * *